US011754987B2

United States Patent
Grabowski et al.

(10) Patent No.: US 11,754,987 B2
(45) Date of Patent: Sep. 12, 2023

(54) BUILDING MANAGEMENT SYSTEM WITH SPACE-BASED AND EQUIPMENT-BASED NOTIFICATION SYSTEM

(71) Applicant: Johnson Controls Tyco IP Holdings LLP, Milwaukee, WI (US)

(72) Inventors: Adam R. Grabowski, Brookfield, WI (US); Jonathan M. Schwabe, Franklin, WI (US); Charles C. Xing, New Berlin, WI (US); Ahmad Khalid, Qadian (IN); Anagha Nyayadhish, Pune (IN); Garrett Wiens-Kind, Milwaukee, WI (US); Dana A. Guthrie, St. Francis, WI (US); Ryan A. Piaskowski, Milwaukee, WI (US); James C. Newell, Port Washington, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 12 days.

(21) Appl. No.: 17/516,314

(22) Filed: Nov. 1, 2021

(65) Prior Publication Data

US 2022/0050431 A1 Feb. 17, 2022

Related U.S. Application Data

(63) Continuation of application No. 16/802,329, filed on Feb. 26, 2020, now Pat. No. 11,188,042.

(60) Provisional application No. 62/811,092, filed on Feb. 27, 2019.

(51) Int. Cl.
 *G05B 15/02* (2006.01)
 *F24F 11/52* (2018.01)

(52) U.S. Cl.
 CPC ............. *G05B 15/02* (2013.01); *F24F 11/52* (2018.01)

(58) Field of Classification Search
 CPC . G05B 15/02; G05B 2219/2614; F24F 11/52; F24F 11/64
 See application file for complete search history.

(56) References Cited

U.S. PATENT DOCUMENTS

| | | | | |
|---|---|---|---|---|
| 9,696,073 | B2* | 7/2017 | Noboa | F25B 13/00 |
| 10,054,919 | B2* | 8/2018 | Westrick, Jr. | G05B 15/02 |
| 10,190,792 | B2* | 1/2019 | Jacobson | F24F 11/30 |
| 10,691,081 | B2* | 6/2020 | Ray | G06Q 10/04 |

(Continued)

*Primary Examiner* — Ramesh B Patel
(74) *Attorney, Agent, or Firm* — Foley & Lardner LLP

(57) ABSTRACT

A building management system (BMS) includes a storage device having instructions stored thereon that, when executed by one or more processors, cause the one or more processors to perform operations. The operations include receiving an indication of an event relating to building equipment operable to serve spaces of a building, the indication identifying at least one of a space or a type of equipment associated with the event, determining, based on the indication, that the one or more criteria are satisfied for a first filter of a plurality of filters, each filter of the plurality of filters associated with a subset of users and specifying one or more criteria for satisfying the filter, the one or more criteria comprising at least one of a space criterion or an equipment criterion, and providing a notification of the event to the subset of users associated with the first filter in response to a determination that the one or more criteria are satisfied for the first filter.

21 Claims, 16 Drawing Sheets

(56) References Cited

U.S. PATENT DOCUMENTS

| | | | |
|---|---|---|---|
| 10,832,564 B2* | 11/2020 | Subramanian | G06F 3/0481 |
| 10,976,068 B2 | 4/2021 | Hallendy et al. | |
| 11,188,042 B2* | 11/2021 | Grabowski | F24F 11/64 |
| 2008/0000630 A1 | 1/2008 | Haglid | |
| 2012/0022700 A1* | 1/2012 | Drees | H02J 13/00004 |
| | | | 705/412 |
| 2015/0178865 A1* | 6/2015 | Anderson | G06Q 50/163 |
| | | | 705/7.25 |
| 2016/0223215 A1* | 8/2016 | Buda | G05D 23/1917 |
| 2016/0258209 A1* | 9/2016 | Berman | E06B 9/32 |
| 2017/0052536 A1* | 2/2017 | Warner | G06Q 10/06312 |
| 2017/0300193 A1* | 10/2017 | Ray | G06F 3/0484 |
| 2017/0315697 A1* | 11/2017 | Jacobson | H04L 12/281 |
| 2019/0052479 A1* | 2/2019 | Piaskowski | G06F 16/90335 |
| 2020/0191427 A1* | 6/2020 | Martin | G05B 19/042 |

\* cited by examiner

FIG. 13

User Management

Users — Roles —1306

—1302

1300

+ User

| Full Name ▼ | Type | Username | Email | Role | Access Type | Last Login | Status | Actions |
|---|---|---|---|---|---|---|---|---|
| Generic User | Metasys | metasyssysagent | jsmith@company.com | 2 Roles | Standard | 03/05/2018 12:00 AM | Locked Out | |
| John Smith | Metasys | jsmith | jsmith@company.com | 3 Roles | Standard | 03/07/2018 12:00 AM | Disabled | |
| Betty White | Metasys | bwhite | bwhite@company.com | Read Only | Basic | 03/03/2018 12:00 AM | Active | |
| Patrick Swayze | Metasys | pstewart | pstw@company.com | Technician | Basic | 03/02/2018 12:00 AM | Active | |
| James Cameron | Metasys | jpicard | jpicard@company.com | Technician | Basic | 03/08/2018 12:00 AM | Active | |
| Granson Grey | Metasys | ggrey | ggrey@company.com | Technician | Basic | 03/09/2018 12:00 AM | Active | |
| Charlie Charles | Metasys | cxav | cxav@company.com | South Corridor | Basic | 03/10/2018 12:00 AM | Active | |

User Management

Users — Roles —1306

—1302

1400

+ Role

| Role Name ▼ | Description | Users | Last Changed | Actions |
|---|---|---|---|---|
| Administrator | All Controlling Admins | 4 | 03/05/2018 12:00 AM by Gbames | |
| Read Only | Those who only read | 3 | 03/07/2018 12:00 AM by Gbames | |
| Technician | Technical folks | 5 | 03/03/2018 12:00 AM by Gbames | |

1304

1500

Add Event Filter

Type  *Required
[Metasys ▼]  ← 1502

Username *
[            ]  ← 1504

Password *
[            ]  ← 1506

Confirm Password *
[            ]

Role
[Select ▼]  ← 1508

All passwords for English users must follow these rules:

• Minumum password length is 8 characters and the maximum length is 50 characters.
• Cannot use a word or group of characters from the blocked word list.
• No spaces are allowed.
• At least one upper case alphabetical character is required.
• At least one lower case alphabetical character is required.
• At leats one numeric digit is required.
• At least one of the following special characters is required @#!?%,-
• Cannot use the consecutive characters from your user name.

The password can not contain any of the following words or groups of characters: either by themselves, or as part of a longer password.

For example, one may not use "JCI123!" as a password because "JCI" is in the list bellow. These words and groups of characters are not case sensitive.

ABCD    Admin    ChangeMe    Alarms    ← 1510

[Cancel]    [Create And Edit]    [Create And Close]

FIG. 15

Summary

< Back

Full Name
Gandalf Grey

Username
ggrey

Email
jsmith@company.com

Role
Administrator

Access
Basic Access

Last Login
03/05/2018 12:00AM

Account Last Modified
12/23/2018

Status
Active

1600

1602 — User Details | Account Settings | Timesheet | Category Access | Space Authorization

Full Name
Gandalf Grey

Description
Manager

Username
ggrey

Email
jsmith@company.com

Phone Number 1
5551234567

Phone Number 2

Actions
Unlock Account
1610 — Force Password Change
1612 — Disable Account

New Password

Confirm New Password

Password Length
Minimum Password Length 8
Maximum Password Length 50

Access Type
Basic Access

Language
English

☐ Single Access User
☑ User Can Modify Own Profile
☐ Temporary User

Expires On
Never

Role
Select ▼

System Privileges
Select ▼

Discard All Events ✕   Snooze All Events ✕
View Metasys Status ✕   Clear Audit History ✕

Close    Save

BUILDING MANAGEMENT SYSTEM WITH SPACE-BASED AND EQUIPMENT-BASED NOTIFICATION SYSTEM

CROSS-REFERENCE TO RELATED PATENT APPLICATIONS

The present application is a continuation of U.S. patent application Ser. No. 16/802,329, filed Feb. 26, 2020, which claims priority to and benefit of U.S. Provisional Patent Application No. 62/811,092, filed Feb. 27, 2019, both of which are incorporated herein by reference in their entirety.

BACKGROUND

The present disclosure relates to building management systems. The present disclosure relates generally to a building management system (BMS), and more particularly to a BMS with a notification system and user interface system that facilitates interaction of various user with the BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

One embodiment of the present disclosure is a building management system (BMS). The BMS includes a storage device having instructions stored thereon that, when executed by one or more processors, cause the one or more processors to perform operations including receiving an indication of an event relating to building equipment operable to serve spaces of a building, the indication identifying at least one of a space or a type of equipment associated with the event, determining, based on the indication, that the one or more criteria are satisfied for a first filter of a plurality of filters, each filter of the plurality of filters associated with a subset of users and specifying one or more criteria for satisfying the filter, the one or more criteria comprising at least one of a space criterion or an equipment criterion, and providing a notification of the event to the subset of users associated with the first filter in response to a determination that the one or more criteria are satisfied for the first filter.

In some embodiments, providing the notification includes transmitting the notification to one or more user devices associated with the subset of users.

In some embodiments, the space criterion requires that the event is associated with a particular space of the building and the equipment criterion requires that the event is associated with a particular device of the building equipment.

In some embodiments, the operations further include receiving, from a user device associated with an administrator, a space authorization and an equipment authorization for each of a plurality of users and determining, based on the space authorization and the equipment authorization, the subset of users of the plurality of users associated with each of the plurality of filters.

In some embodiments, the operations further include providing a graphical user interface, where providing the notification includes presenting the notification via the graphical user interface.

In some embodiments, the operations further include receiving, from a user device associated with the subset of users and in response to the notification, a user input, and controlling the building equipment according to the user input.

In some embodiments, the notification is a first notification, the operations further including determining whether the first notification has been acknowledged after an amount of time, and transmitting a second notification responsive to a determination that the first notification has not been acknowledged after the amount of time.

In some embodiments, the operations further include receiving a user input indicating a new filter and storing the new filter with the plurality of filters.

Another embodiment of the present disclosure is a method. The method includes receiving an indication of the event, the indication identifying at least one of a space or a type of equipment associated with the event, determining, based on the indication, that one or more criteria are satisfied for a first filter of a plurality of filters, each filter of the plurality of filters associated with a subset of users and specifying one or more criteria for satisfying the filter, the one or more criteria comprising at least one of space criterion or equipment criterion, and providing a notification of the event to the subset of users associated with the first filter in response to a determination that the one or more criteria are satisfied for the first filter.

In some embodiments, providing the notification includes transmitting the notification to one or more user devices associated with the subset of users.

In some embodiments, the space criterion requires that the event is associated with a particular space of the building and the equipment criterion requires that the event is associated with a particular device of the building equipment.

In some embodiments, the method further includes receiving, from a user device associated with an administrator, a space authorization and an equipment authorization for each of a plurality of users and determining, based on the space authorization and the equipment authorization, the subset of users of the plurality of users associated with each of the plurality of filters.

In some embodiments, the method further includes providing a graphical user interface, where providing the notification includes presenting the notification via the graphical user interface.

In some embodiments, the method further includes receiving, from a user device associated with the subset of users and in response to the notification, a user input, and controlling the building equipment according to the user input.

In some embodiments, the notification is a first notification, the method further including determining whether the first notification has been acknowledged after an amount of time, and transmitting a second notification responsive to a determination that the first notification has not been acknowledged after the amount of time.

In some embodiments, the method further includes receiving a user input indicating a new filter and storing the new filter with the plurality of filters.

Yet another embodiment of the present disclosure is a system. The system includes an event detection circuit configured to detect an event relating to building equipment and characterize the event as associated with at least one of a space or a type of equipment, a notification system configured to provide a notification of the event to one or more users of the building management system by storing a plurality of filters, each filter associated with one or more criteria for satisfying the filter, the one or more criteria including at least one of a space criterion or an equipment criterion, receiving an indication of the event from the event detection circuit, the indication identifying at least one of the space or the type of equipment associated with the event, determining, based on the indication, that the one or more criteria are satisfied for a first filter of the plurality of filters, and providing a notification of the event to a first set of users associated with the first filter in response to a determination that the one or more criteria are satisfied for the first filter.

In some embodiments, providing the notification includes transmitting the notification to one or more user devices associated with the subset of users.

In some embodiments, the space criterion requires that the event is associated with a particular space of the building and the equipment criterion requires that the event is associated with a particular device of the building equipment.

In some embodiments, the notification system is further configured to provide a graphical user interface, where providing the notification includes presenting the notification via the graphical user interface.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 13 is a sixth view of an administrator portal in a graphical user interface for a BMS, according to an exemplary embodiment.

FIG. 14 is a seventh view of an administrator portal in a graphical user interface for a BMS, according to an exemplary embodiment.

FIG. 15 is an eighth view of an administrator portal in a graphical user interface for a BMS, according to an exemplary embodiment.

FIG. 16 is a ninth view of an administrator portal in a graphical user interface for a BMS, according to an exemplary embodiment.

FIG. 18 is an eleventh view of an administrator portal in a graphical user interface for a BMS, according to an exemplary embodiment.

DETAILED DESCRIPTION

Building HVAC Systems and Building Management Systems

Figure 1:
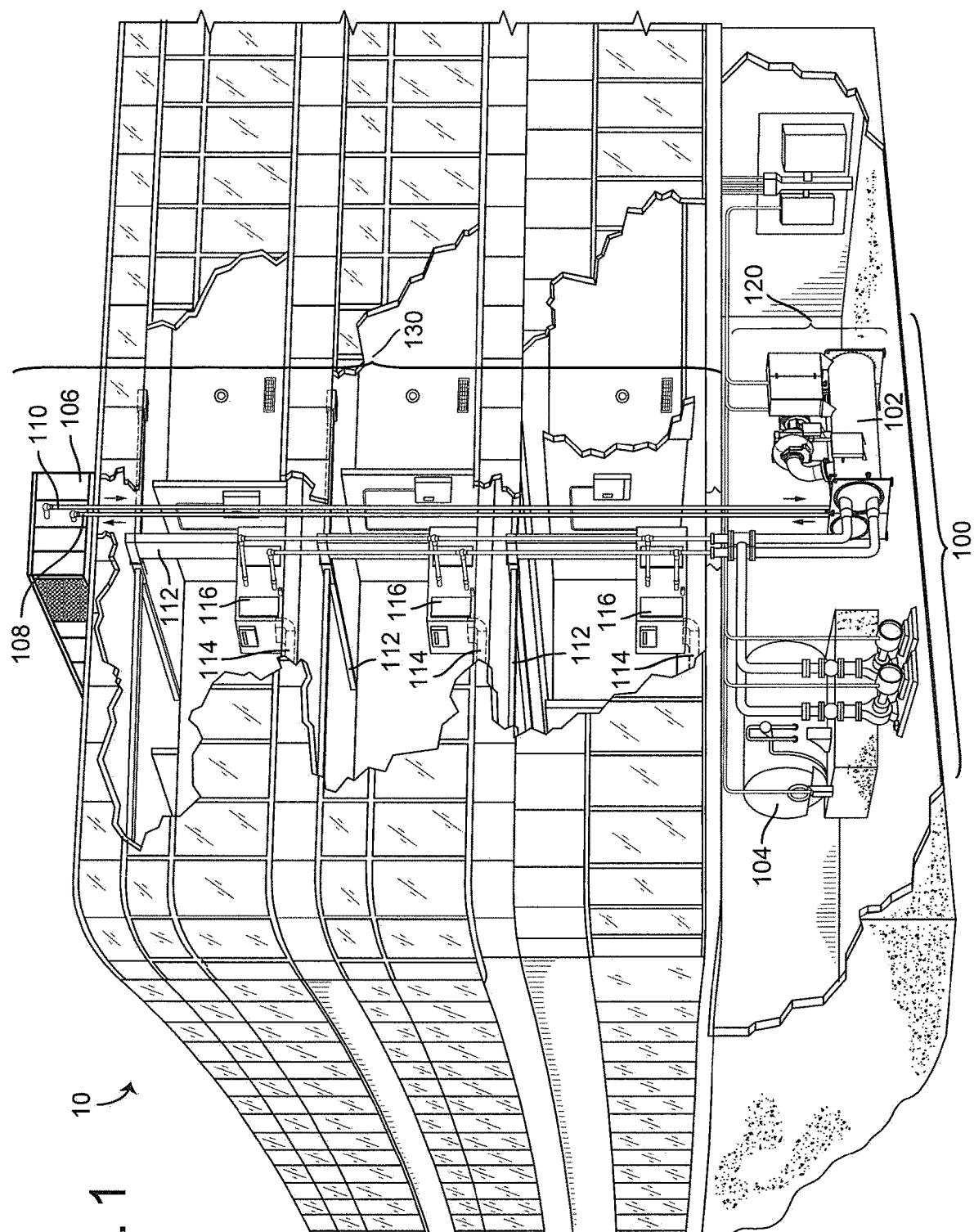
FIG. 1 is a drawing of a building equipped with a HVAC system, according to an exemplary embodiment.
Figure 2:
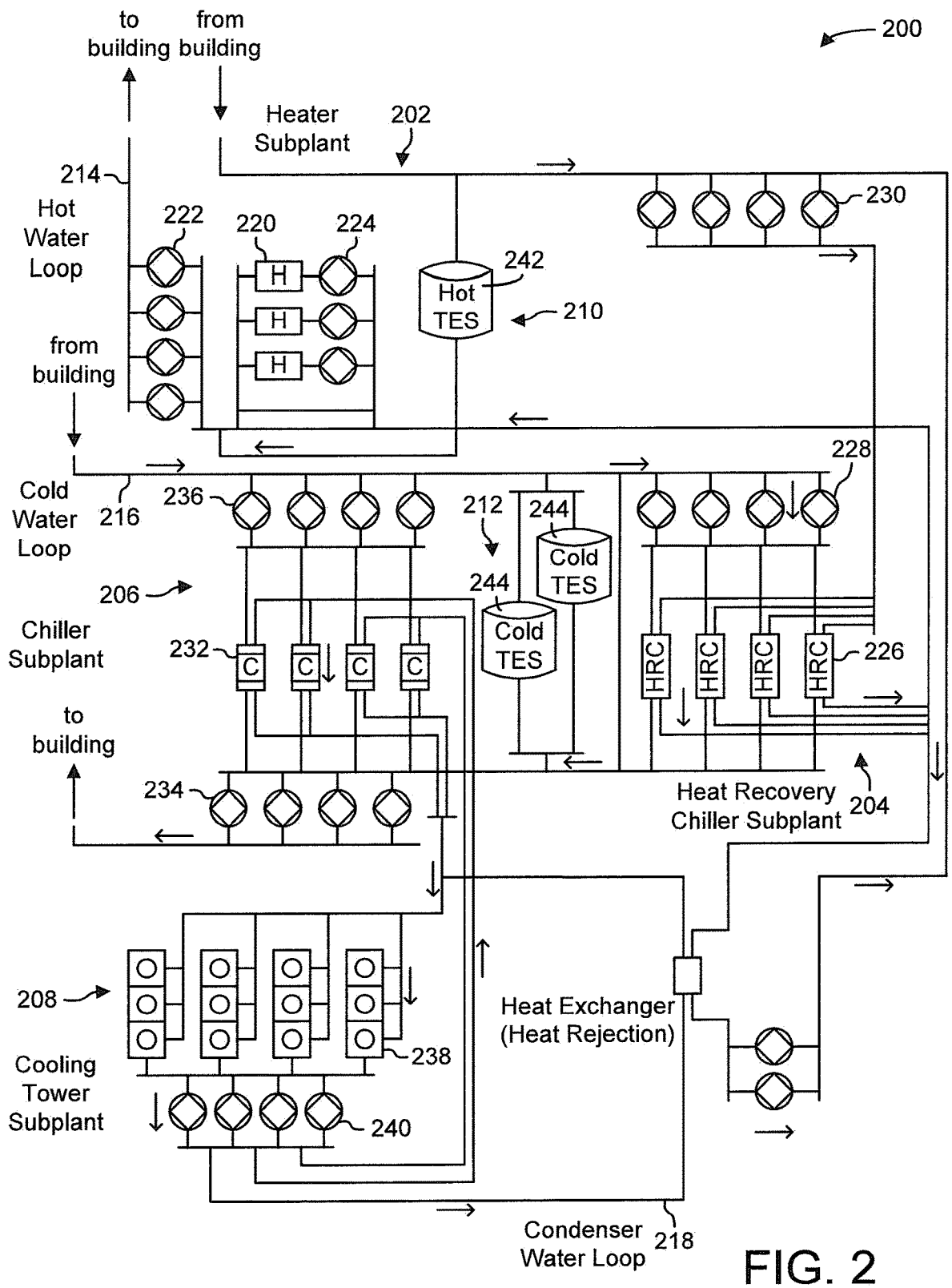
FIG. 2 is a block diagram of a waterside system which can be used to serve the building of FIG. 1, according to an exemplary embodiment.
Figure 3:
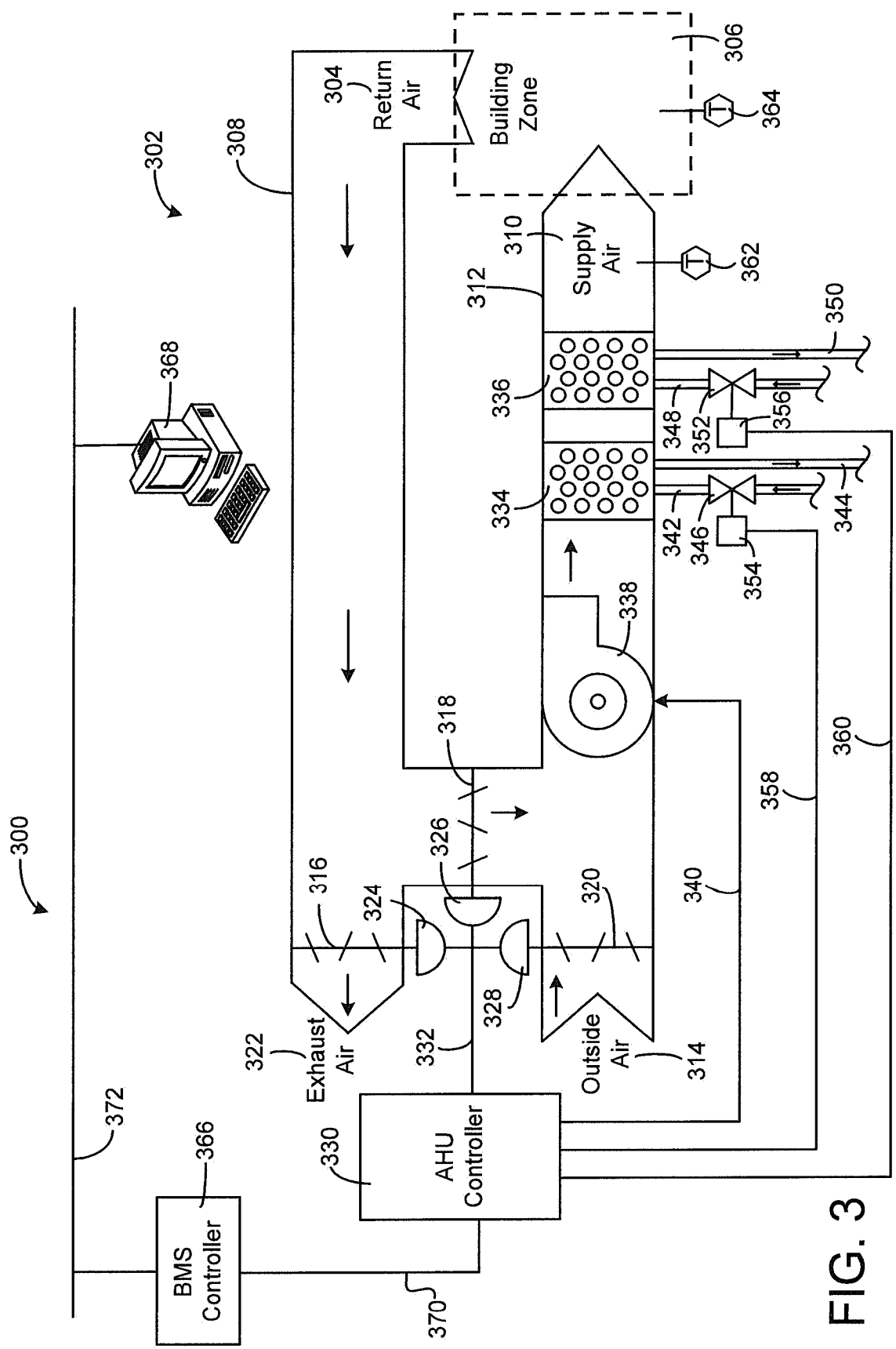
FIG. 3 is a block diagram of an airside system which can be used to serve the building of FIG. 1, according to an exemplary embodiment.
Figure 4:
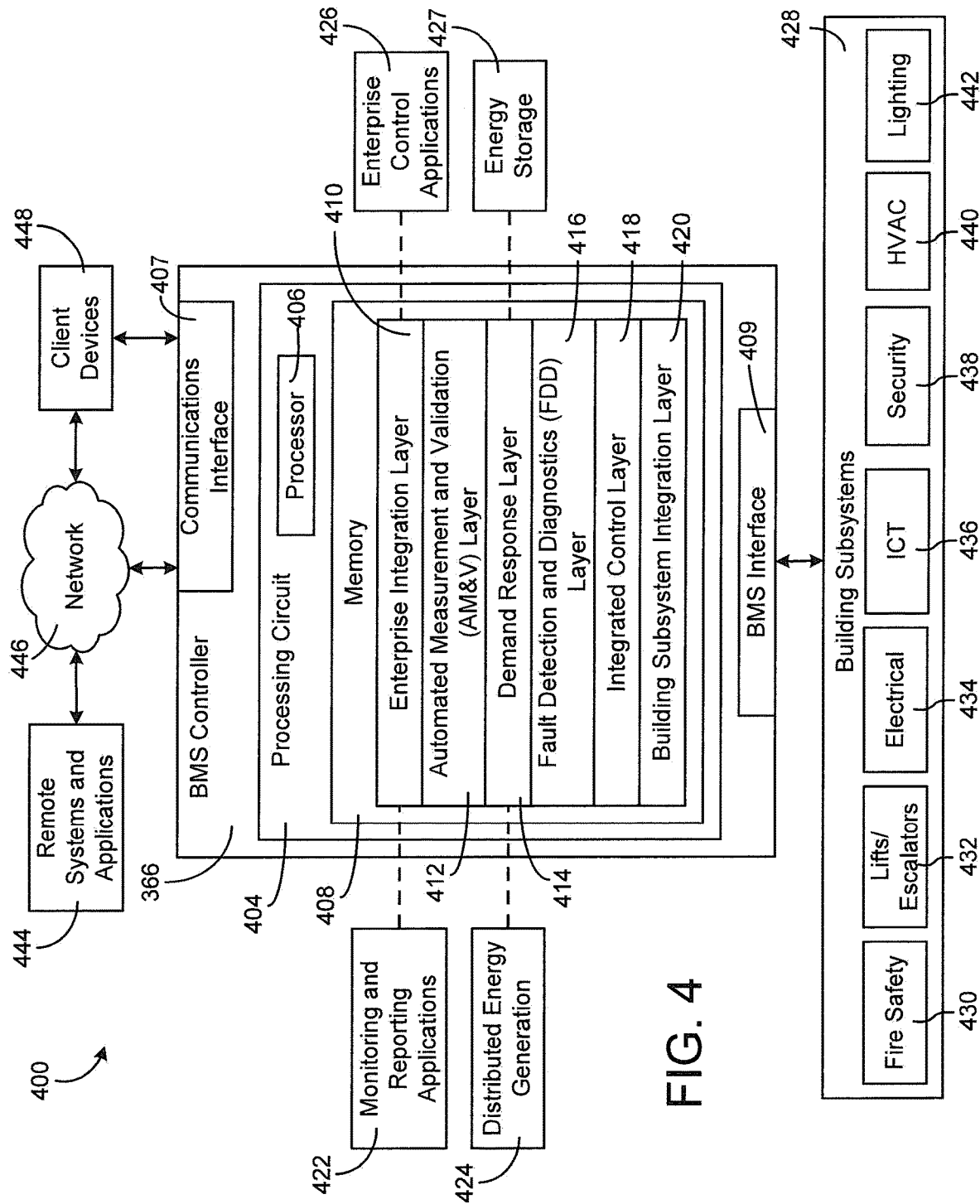
FIG. 4 is a block diagram of a building management system (BMS) which can be used to monitor and control the building of FIG. 1, according to an exemplary embodiment.
Figure 5:
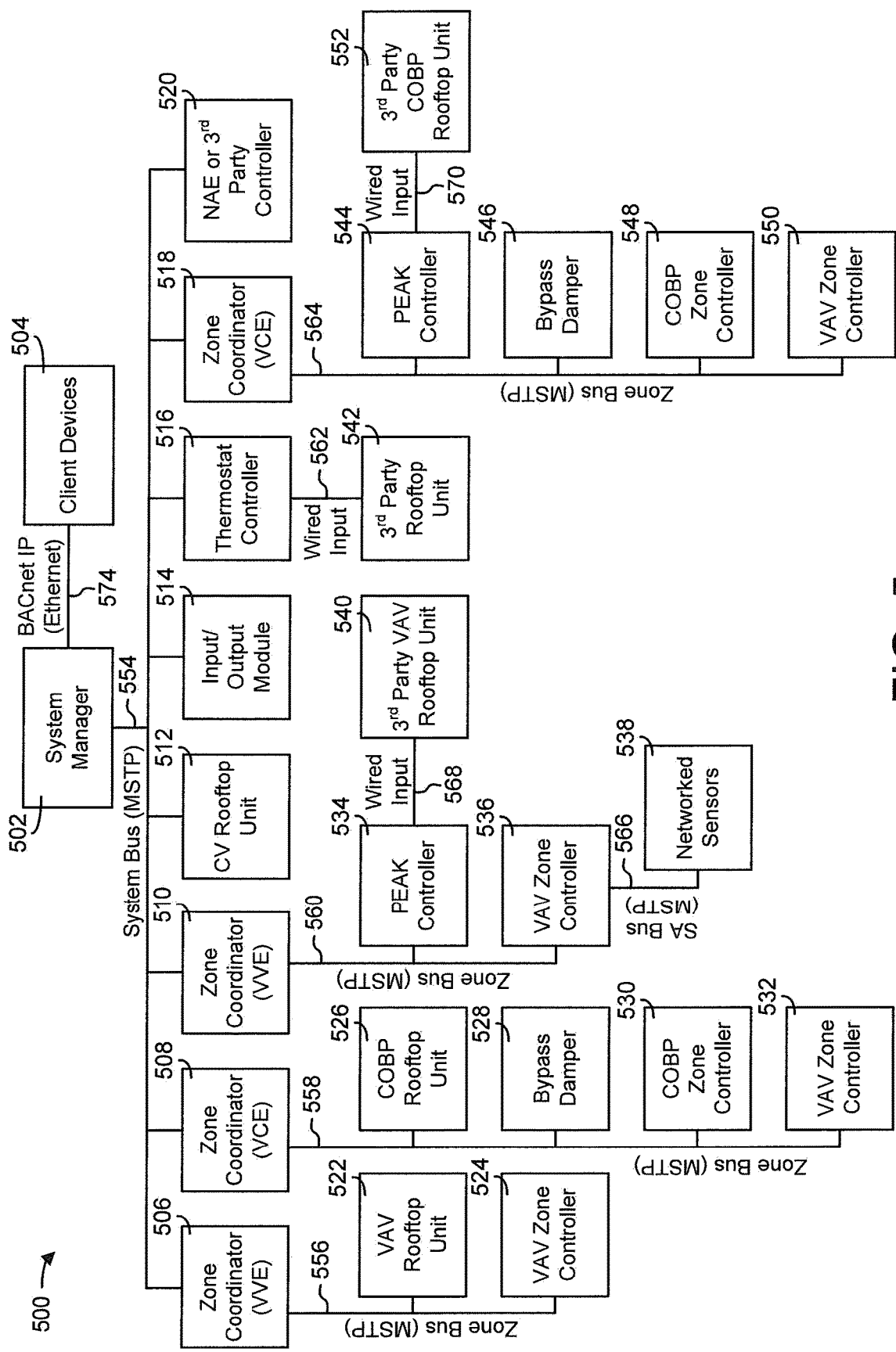
FIG. 5 is a block diagram of another BMS which can be used to monitor and control the building of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem.

Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Space-Based and Equipment-Based User Management and Notification System

Figure 6:
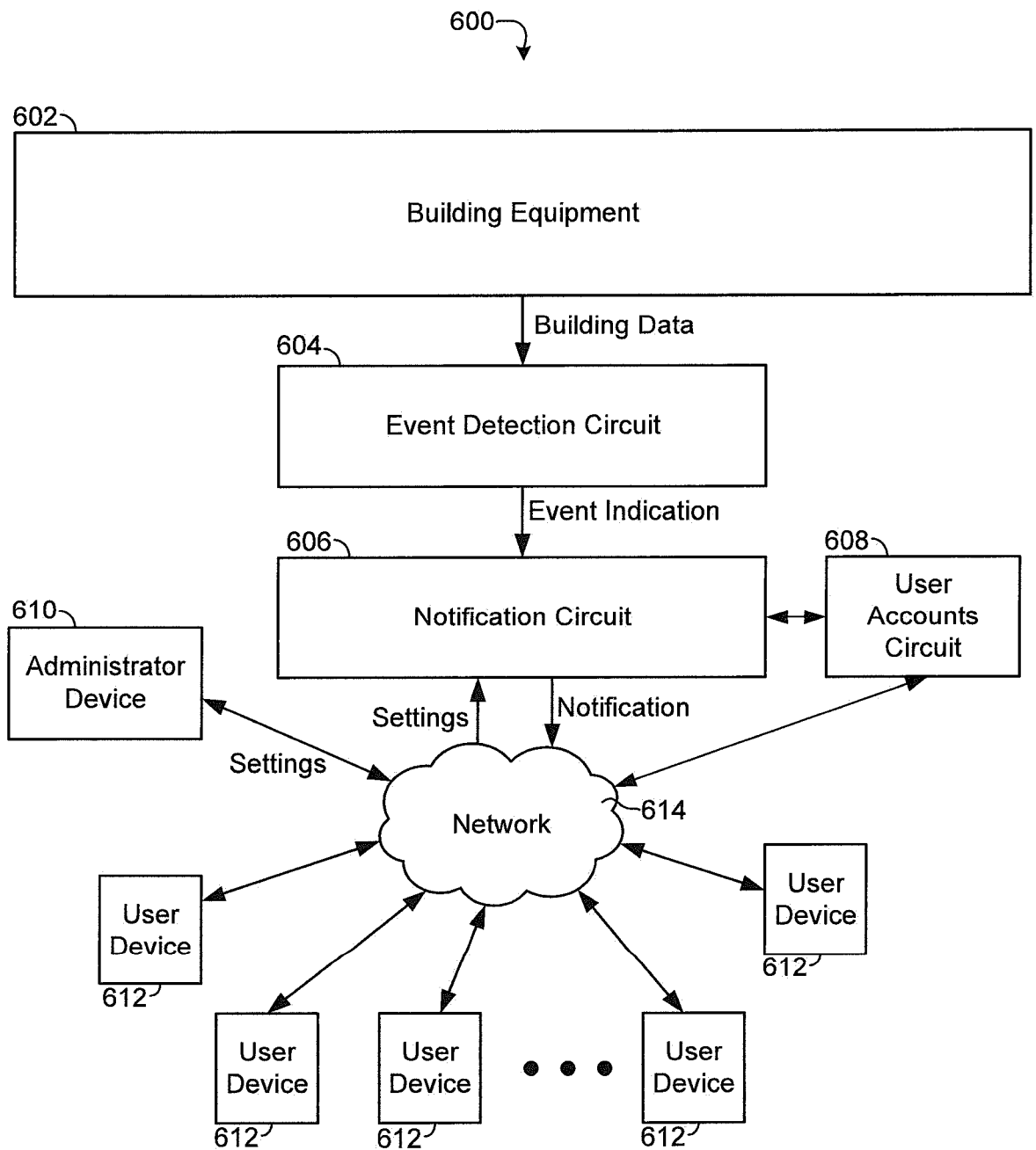
FIG. 6 is a block diagram of a notification and user management system for use with a BMS, according to an exemplary embodiment.

Referring now to FIG. 6, a system 600 is shown, according to an exemplary embodiment. The system 600 includes building equipment 602, an event detection circuit 604, a notification circuit 606, user accounts circuit 608, an administrator device 610, and multiple user devices 612. The administrator device 610 and the multiple user devices 612 are communicable with the notification circuit 606 and/or the user accounts circuit 608 via a network 610 (e.g., a wireless network, the Internet, a cellular network).

The building equipment 602 may include devices of various types (e.g., chillers, boilers, AHUs, VAVs, fans, light fixtures, fire safety devices, intrusion detection devices, security cameras, various sensors) across various building domains (e.g., HVAC, fire, access, lighting). Each device may serve (e.g., affect or measure) one or more spaces (e.g., rooms, hallways, etc. of a building or campus).

The event detection circuit 604 is configured to detect events relating to the building equipment 602 based on building data received from the building equipment 602. In some embodiments, events relating to building equipment 602 may include state transitions (e.g., transitioning from a normal state to an alarm or warning state). For example, the event detection circuit 604 may monitor the building data and detect equipment faults based on the building data. In such a case, an event may be generated or identified that corresponds to a fault event or an ongoing fault condition. As another example, an event may correspond to a fire event, intrusion event, or other emergency event detected by properly-functioning building equipment 602. The present disclosure contemplates a broad range of types of events. It should be understood that the term "events" should not be limited by the examples provided herein.

In some cases, the event detection circuit 604 is configured to associate the event with a space. The event detection circuit 604 may associate the event with a space indirectly, by determining the space based on the equipment that is experiencing the event. For example, the event may be associated with a space based on an indication that equipment located in the space is experiencing the event. An event may be associated with a space when the event occurs at the space, equipment relating to the event is located in the space, or the space is otherwise involved with the event. In some cases, the event detection circuit 604 is configured to associate the event with a type of equipment (e.g., HVAC, chiller) and/or with a particular device of equipment (e.g., a particular chiller).

The event detection circuit 604 is configured to provide an indication of the event to the notification circuit 606. The event detection circuit 604 is configured to add metadata to the event indication, for example indicating space, equipment instance, equipment type, etc. associated with the event. The event detection circuit 604 may use a common data model to apply the metadata. Accordingly, the event indication can include various information about the event, including one or more spaces and one or more types of equipment and/or particular devices of building equipment associated with the event and a time of the event and a type of the event.

The notification circuit 606 is configured to receive the event indication 606 from the event detection circuit 604, determine one or more users to receive a notification of the event, and provide the notification to those users. As described in detail below, the notification circuit 606 uses filters to identify a subset of users of the BMS who an administrator desires to receive a notification for an event. The notification circuit 606 is also configured to generate a notification (e.g., email, text message, print-out) and provide the notification to one or more user devices 612 via the network 614.

The user accounts circuit 608 is configured to store various information about various user accounts in the BMS. For example, the user accounts circuit may store biographical information about users, contact information for users, equipment authorizations specifying which type of equipment a user may have access to, and space authorizations specifying which spaces a user may have access to. The content of user accounts is described in more detail below with reference to FIGS. 13-18. User account information may be used to allow and/or prevent a user from controlling building equipment and/or accessing data relating to the building equipment in accordance with authorization information stored in a user account for the user. In some embodiments, the user account does not directly store equipment authorization, but rather stores equipment authorization categories for a user. In such embodiments, the equipment itself may be associated with a particular equipment authorization category.

The administrator device 610 is configured to present a graphical user interface that prompts an administrator (e.g., human) to input settings for the notification circuit and/or user account information for the user accounts circuit 608 and to receive such input from an administrator. The administrator device 610 may be a desktop computer, laptop computer, tablet, smartphone, augmented reality device, virtual reality device, etc. The administrator device 610 is communicable with the notification circuit 606 via the network 614. In some embodiments, the administrator device 610 is any device that can present a user interface for performing administrative tasks. In such embodiments, the user interface may be accessed by any user (e.g., of any user device) with proper authorization.

Each user device 612 is associated with a user of the BMS (e.g., a user with an account at the user accounts circuit 608) and is configured to receive a notification from the notification circuit 606 via the network 614 and present the notification to a user. In various embodiments, the user devices 612 may include desktop computers, laptop computers, tablets, smartphones, augmented reality devices, virtual reality devices, printers, fax machines, smart speakers, etc., including combinations thereof. For example, in one embodiment, the notification circuit 606 may transmit notifications as emails directed to email addresses associated with users. In such a case, a user device 612 can include any device capable of allowing a user to receive and view emails (e.g., capable of allowing a user to access an email inbox hosted on a remote server).

A user device 612 can also be configured to allow a user to provide input to the BMS. For example, the notification may include a link or other interface object that a user may select to enter a command to the BMS. A notification may thereby facilitate a user in controlling building equipment in response to an event.

Figure 7:
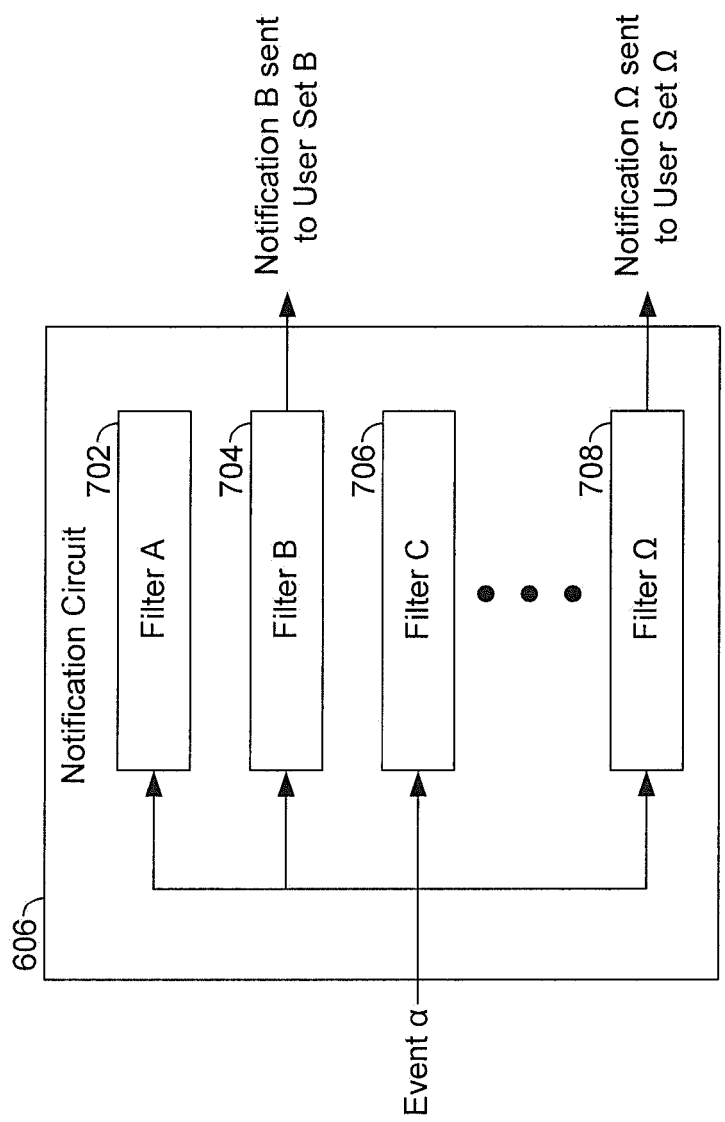
FIG. 7 is an illustration of filters in a notification circuit of the notification and user management system of FIG. 6, according to an exemplary embodiment.

Referring now to FIG. 7, an illustration of a filtering process executed by the notification circuit 606 is shown, according to an exemplary embodiment. As shown in FIG. 7, the notification circuit 606 receives an event indication (shown as Event a) from the event detection circuit 604. The event indication includes various information about the event, including, for example and in various cases, a time of the event, a space associated with the event, a type of equipment associated with the event, a particular device of equipment associated with the event, a type of the event (e.g., alarm, fault, etc.), a priority level of the event, and/or other information.

The notification circuit 606 compares this information against criteria associated with multiple filters 702-708 stored by the notification circuit 606. That is, the notification circuit 606 includes any number of filters. Each of filters 702-708 includes one or more criteria required for an event to pass through the filter. Each of filters 702-708 is also associated with a notification and a subset of the users of the BMS. When an event passes through one of filters 702-708 (i.e., when the one or more criteria for a filter is satisfied), the corresponding notification is sent to the corresponding subset of users. In the example shown in FIG. 7, Event a satisfies the criteria of filter 704 ("Filter B") and the criteria of filter 708 ("Filter Ω"), but not the criteria of filter 702 ("Filter A") or filter 706 ("Filter C"). Accordingly, a notification associated with filter 704 is sent to a subset of users associated with filter 704 (e.g., User Set B) and a notification associated with filter 708 is sent to a subset of user associated with filter 708 (e.g., User Set Ω). Meanwhile, in the example shown, filter 702 and filter 706 prevent Event a from triggering the notifications associated with filters 702 and 706.

In the example shown, filter 702 and filter 704 each include a space criterion that requires that an event be associated with a particular space for the event to satisfy the filter. Filter 702 requires that the event be associated with a first space, and filter 704 requires that the event be associated with a second space. The notification circuit 606 compares a space identified by the event indication with the space criterion. If the space identified by the event indication does not match the space criterion (e.g., as for filter 702 in the example shown), then the notification circuit 606 prevents the event from triggering a notification associated with that filter. If the space identified by the event indication matches the space criterion (e.g., as for filter 704 in the example shown), the notification circuit can provide the notification associated with the filter to a subset of users (assuming that any other criteria of the filter are also satisfied).

Also in the example shown, filter 706 and filter 708 each include an equipment criterion that require an event be associated with a particular type or device of equipment for the event to satisfy the filter. In this example, filter 706 requires that the event be associated with a first device of equipment, while filter 704 requires that the event be associated with a second device of equipment. The notification circuit 606 compares an equipment type or device identified in the event indication received from the event detection circuit 604 with the equipment criterion. If the equipment identified by the event indication does not match the equipment criterion (as for filter 706 in the example shown), then the notification circuit 606 prevents the event from triggering a notification associated with that filter. If the equipment identified by the event indication does match the equipment criterion (as for filter 708) in the example shown, the notification can provide the notification associated with the filter to a subset of users (assuming that any other criteria of the filter are also satisfied).

As mentioned in the foregoing, the notification circuit 606 stores a notification corresponding to each of the filters. The notification includes a title, a list of recipients (e.g., usernames, email addresses, IP addresses, etc.), and other preferences relating to the formatting and/or content of the notification to be provided to the users on the list. The notification circuit 606 pushes the notification(s) to the user devices 612 based such preferences.

Referring now to FIGS. 8-12, various views in a graphical user interface for inputting notification and filter settings to the notification circuit 606 are shown, according to exemplary embodiments. The views shown in FIGS. 8-12 may be provided on the administrator device 610 to facilitate an administrator in customizing the filters and notifications described above.

Figure 8:
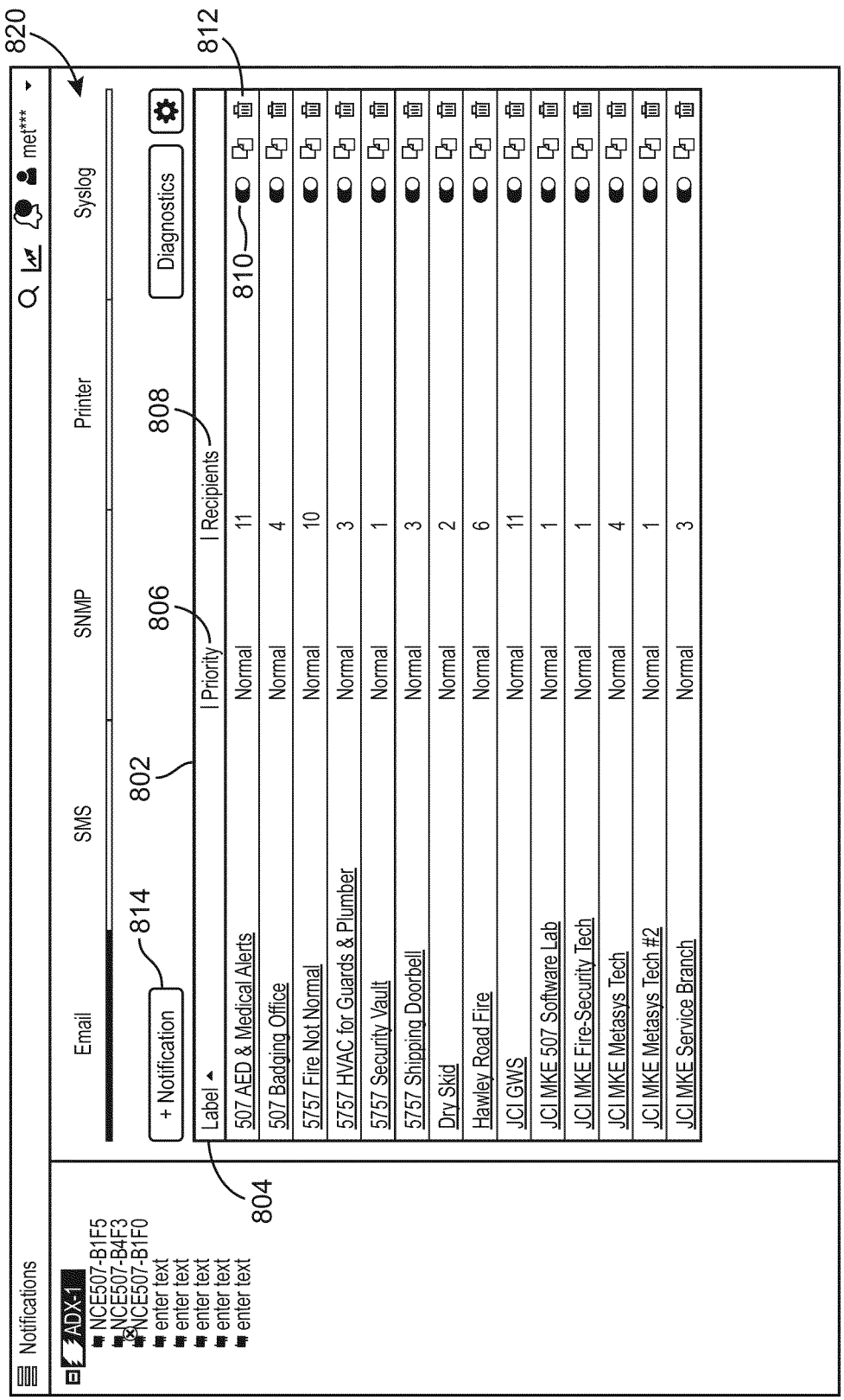
FIG. 8 is a first view of an administrator portal in a graphical user interface for a BMS, according to an exemplary embodiment.

FIG. 8 shows a list of notifications 802 and includes options to modify the existing notifications and/or to add a new notification. As shown in FIG. 8, each notification is identified by a label 804 associated with a priority level 806, a number of recipients 808, an on/off toggle 810, and a delete button 812. The on/off toggle 810 may be engaged by a user to turn the notification on or off, such that the notification is not provided to the recipients when the on/off toggle 810 is set to 'off' and is provided to the recipients when the on/off toggle 810 is set to 'on'. The delete button 812 can be selected to delete the corresponding notification. An add notification button 814 is selectable to initiate a workflow to create a new notification.

As indicated by along the top of the view of FIG. 8, the list of notifications 802 shown are for email notifications, i.e., notifications distributed to recipients via email when a corresponding event occurs. Various tabs 820 are included to switch to views that show SMS notifications (i.e., notifications distributed to recipients as text messages when a corresponding event occurs), SNMP notifications, printer notifications (i.e., notifications automatically printed onto paper at one or more printers when a corresponding event occurs), and Syslog notifications (i.e., notifications stored in a system log when a corresponding event occurs).

Figure 9:
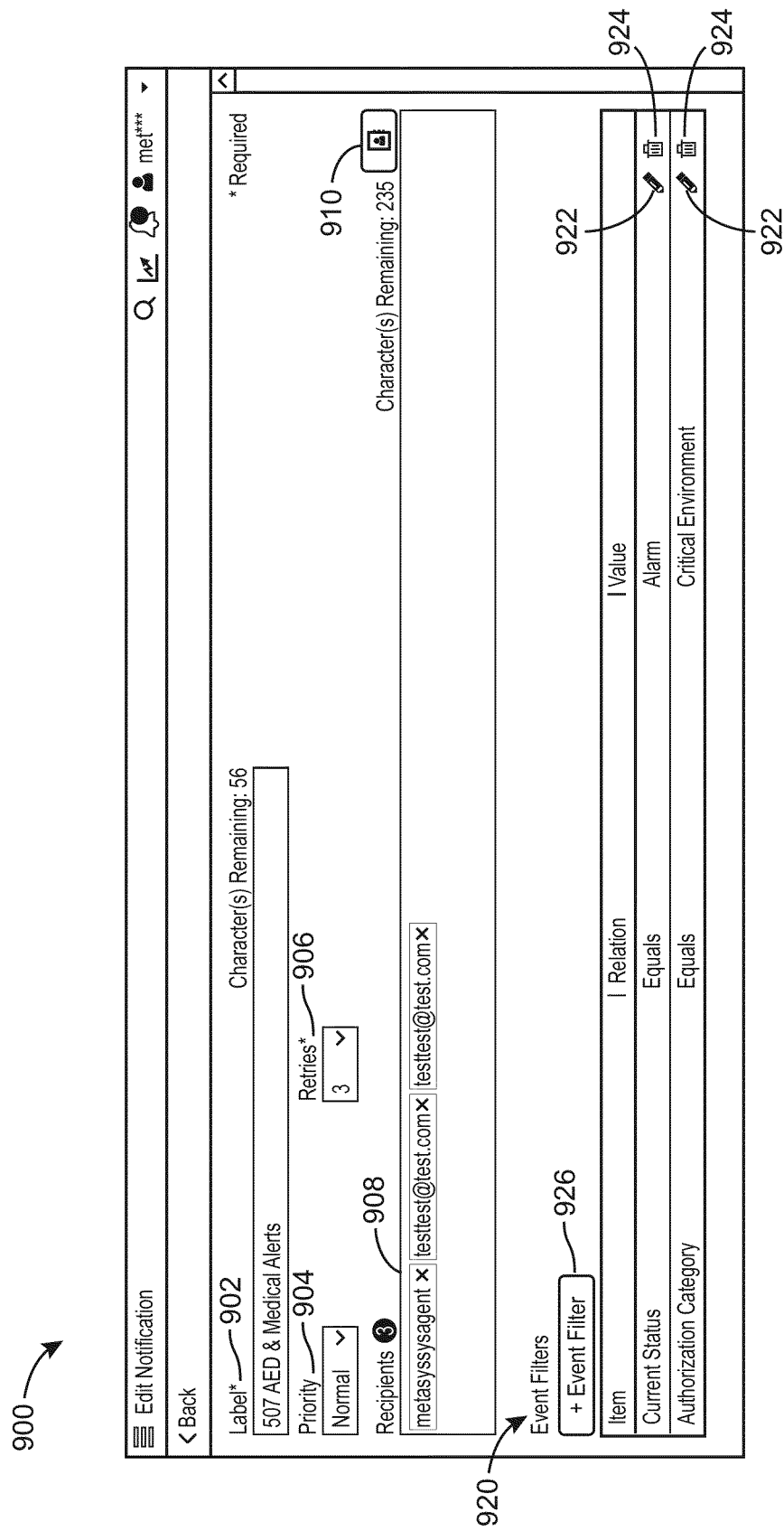
FIG. 9 is a second view of an administrator portal in a graphical user interface for a BMS, according to an exemplary embodiment.

The label of a notification from list 800 may be selected to launch the edit notification view 900 shown in FIG. 9. In the example shown, the "507 AED & Medical Alerts" button was selected, and the edit notification view 900 for the corresponding notification was launched in response. The edit notification view 900 allows an administrator to edit a notification label 902, a notification priority 904, a number of retries 906 (i.e., in case of failed delivery of a notification), and a list of recipients 908. Recipients may be added by text entry of email addresses or usernames. Additionally, an address book button 910 is included and is selectable to launch an address book that allows the administrator to select recipients from a pre-populated list of possible recipients (e.g., a set of user accounts, a set of employees of a company). The recipients who have been selected are listed in the list of recipients 908 of the edit notification view. A recipient may be removed by engaging a remove button positioned next to the recipient's name or address.

The edit notification view also includes an event filters widget 920. The event filters widget 920 lists event filters that define the event(s) which will cause the notification to be provided to the recipients listed in the list of recipients 908. An existing event filter can be edited by selecting a corresponding edit button 922 or deleted by selecting a corresponding delete button 924. A new event filter can be added by selecting the add event filter button 926 to launch the add event filter shown in FIG. 10. As indicated by FIG. 9, multiple event filters (i.e., criteria) may be combined to define the filter for the notification.

Figure 10:
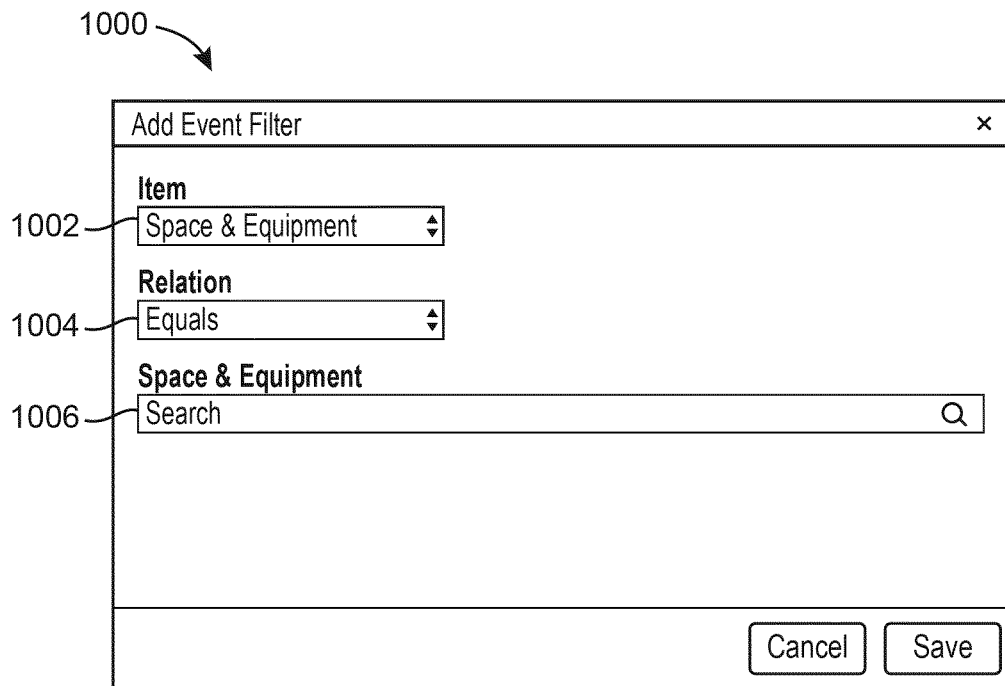
FIG. 10 is a third view of an administrator portal in a graphical user interface for a BMS, according to an exemplary embodiment.

FIG. 10 shows an add event filter widget 1000. The add event filter widget 1000 allows a user to add and define a new event filter, i.e., to define a criterion against which an incoming event indication can be checked. The add event filter widget 1000 includes an item drop down menu 1002 that allows a user to select an item to be considered in the event filter. The items selectable on the item drop down menu 1002 may include alarm priority, acknowledgement required, authorization required, current status, previous status, equipment, equipment definition, and/or space, among other possible options. The item denotes the type of information from the incoming event indication that will be checked against the new event filter. The add event filter widget also includes a relation drop down menu 1004. The relations selectable on the relation drop down menu 1004 include equal, greater than, less than, not equal, etc. A third field allows a user to define what the relation is evaluated in relation to, and may change in accordance with a user selection on the item drop down menu 1002.

In the example shown, a search space & equipment field 1006 is included as the third field that allows a user to search for and select one or more spaces or devices. For example, the user might select a space (e.g., "West Conference Room") in field 1006 and "equals" from the relation drop down menu 1004 in order to define the new event filter to require an event to be associated equivalently with the first space (e.g., to require that the event occurs at the West Conference Room). Accordingly, as shown in FIG. 10, the add event filter widget 1000 facilitates creation of an event filter (e.g., a space criterion) that can be used as the only criterion for a filter for the corresponding notification or combined with additional filters/criteria to form a more restrictive filter.

Figure 11:
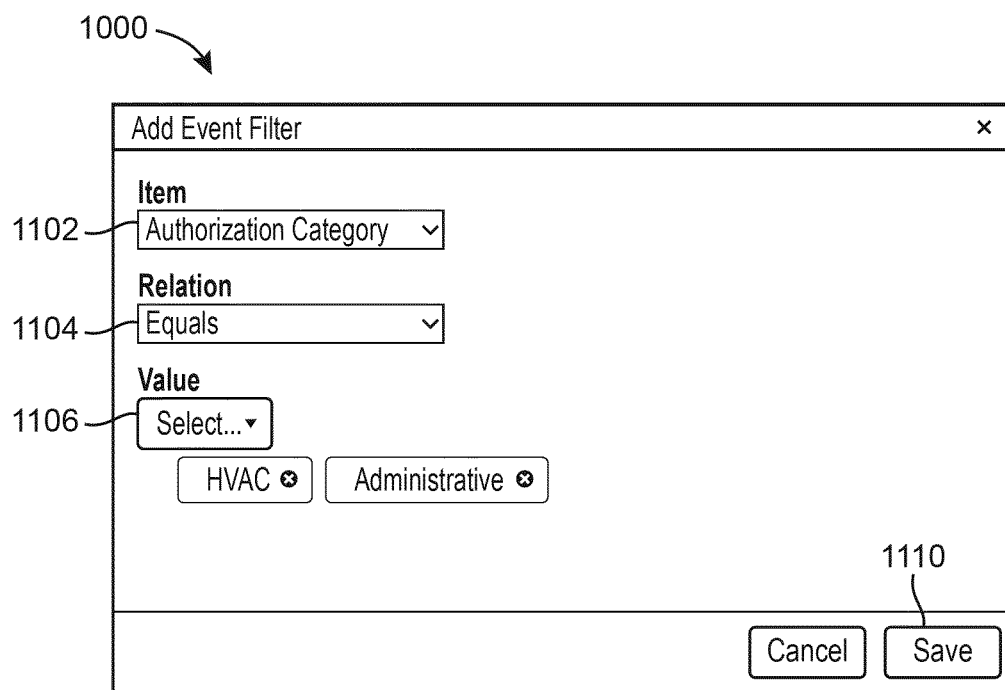
FIG. 11 is a fourth view of an administrator portal in a graphical user interface for a BMS, according to an exemplary embodiment.

FIG. 11 shows another view of the add event filter widget 1000 in which "Authorization Category" is selected from the item drop down menu 1002. The third field has been updated to show a value drop down menu 1108. The value drop down menu 1108 may include various authorization categories that may be selected by a user to add to a list of authorizations. As shown in FIG. 11, the authorization categories "HVAC" and "Administrative" have already been selected from the value drop down menu 1108 for inclusion in the event filter and are shown as buttons on the add event filter widget 1000. Each button can be selected to remove the corresponding authorization category from the event filter. A save button 1110 is included in the add event filter widget 1000 and is selectable to save (i.e., add) the selected event filter and return to the edit notification view 900 of FIG. 9.

Figure 12:
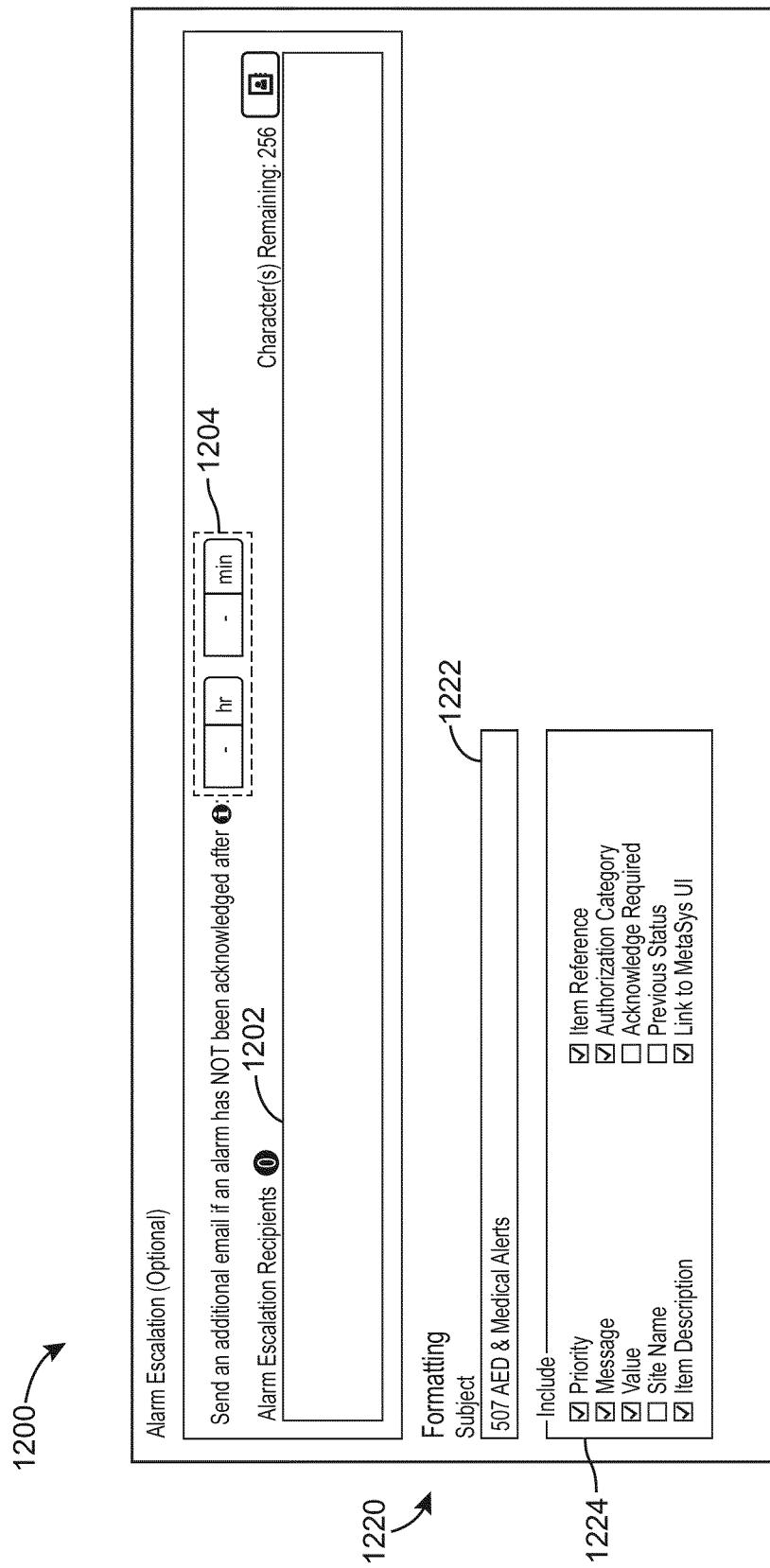
FIG. 12 is a fifth view of an administrator portal in a graphical user interface for a BMS, according to an exemplary embodiment.

FIG. 12 shows an alarm escalation widget 1200 and a formatting widget 1220 that may be included with the edit notification view of FIG. 9. The alarm escalation widget 1200 allows a user to define an escalation strategy for the notification. As shown in FIG. 12, the alarm escalation widget 1200 allows a user to instruct the notification circuit 606 to send a message/notification to the recipients listed in an alarm escalation recipients box 1202 if the alarm/event has not been acknowledged after an amount of time entered in a time entry box 1204. That is, in the example of FIG. 12, the notification circuit 606 can provide a link, button, or other means for a notification recipient to acknowledge receipt of a notification. The notification circuit 606 can monitor the amount of time that has elapsed since transmission of the original notification, and, if no acknowledgement is received in an administrator-specified amount of time, send a second notification to the alarm escalation recipients specified by the administrator.

The formatting widget 1220 shown in FIG. 12 allows a user to select a subject line 1222 for a notification email (or other title for other types of notifications) and to select various items 1224 to be included in the notification message. For example, as shown in FIG. 12, a series of checkboxes may be used to allow a user to select whether the user should be provided with a priority, message, value, site name, item description, item reference, authorization category, acknowledge required, previous status, and/or a link to a view in a graphical user interface provided by the building management system relating to the event. Other options may be available in various embodiments.

The graphical user interface illustrated in FIGS. 8-12 thereby prompt a user to input information to define various event filters and otherwise customize notifications to be provided to user devices 612. These filters can include criteria based on spaces and equipment relating to the events, allowing event notifications to be distributed based on which spaces and equipment are affect by these events. This may be particularly useful where particular technicians, building staff, or other users are responsible for particular spaces or equipment. In such a case, the notification circuit 606 can be tailored to only provide a particular user or team of users with notifications relevant to that user or team of users.

Referring now to FIGS. 13-17, a series of views in a graphical user interface configured to facilitate creation and customization of user accounts for use with the BMS is shown, according to an exemplary embodiment. The graphical user interface can be provided by the user accounts circuit 608 and displayed on the administrator device 610.

FIG. 13 shows a list 1300 of users of the BMS. For each user on the list 1300, the list 1300 shows the user's name (e.g., legal name), a type of the user, a username, an email address, a role or an indication that the user has multiple roles, an access type, a last login time, and a status. Several buttons are included for each user to allow an administrator to take various actions relating to that user (delete, edit, etc.). FIG. 13 also includes an add user button 1302 that is selectable to launch a create new user widget 1500, as shown in FIG. 15.

By switching from a users tab 1304 ("Users") to a roles tab 1306 ("Roles") at the top of the view of FIG. 13, a user can navigate to the view shown in FIG. 14 where the graphical user interface includes a list of roles 1400. For each role, the list of roles 1400 shows a role name, a description, and number of users assigned to that role, a last-changed stamp, and several buttons that allow an administrator to take various actions relating to the corresponding role.

FIG. 15 shows a create new user widget 1500 that prompts an administrator to input information to create a new user. In the example of FIG. 15, such information includes a user type 1502, a user name 1504, a password 1506, and a role 1508 for the user. An administrator may input such information and then select a create and edit button 1510 to navigate to the user management widget 1600 shown in FIGS. 16-18.

FIG. 16 shows a view of a user details tab of the user management widget 1600. A user details tab 1602 allows an administrator to input various biographical and authentication information relating to the user (e.g., name, description, username, email, phone number, password, password requirements, access type, language, expiration date, role, system privileges). The user details tab 1602 may provide an option 1610 to force the user to change a password. The user details tab 1602 may also provide an option 1612 to disable the account.

Figure 17:
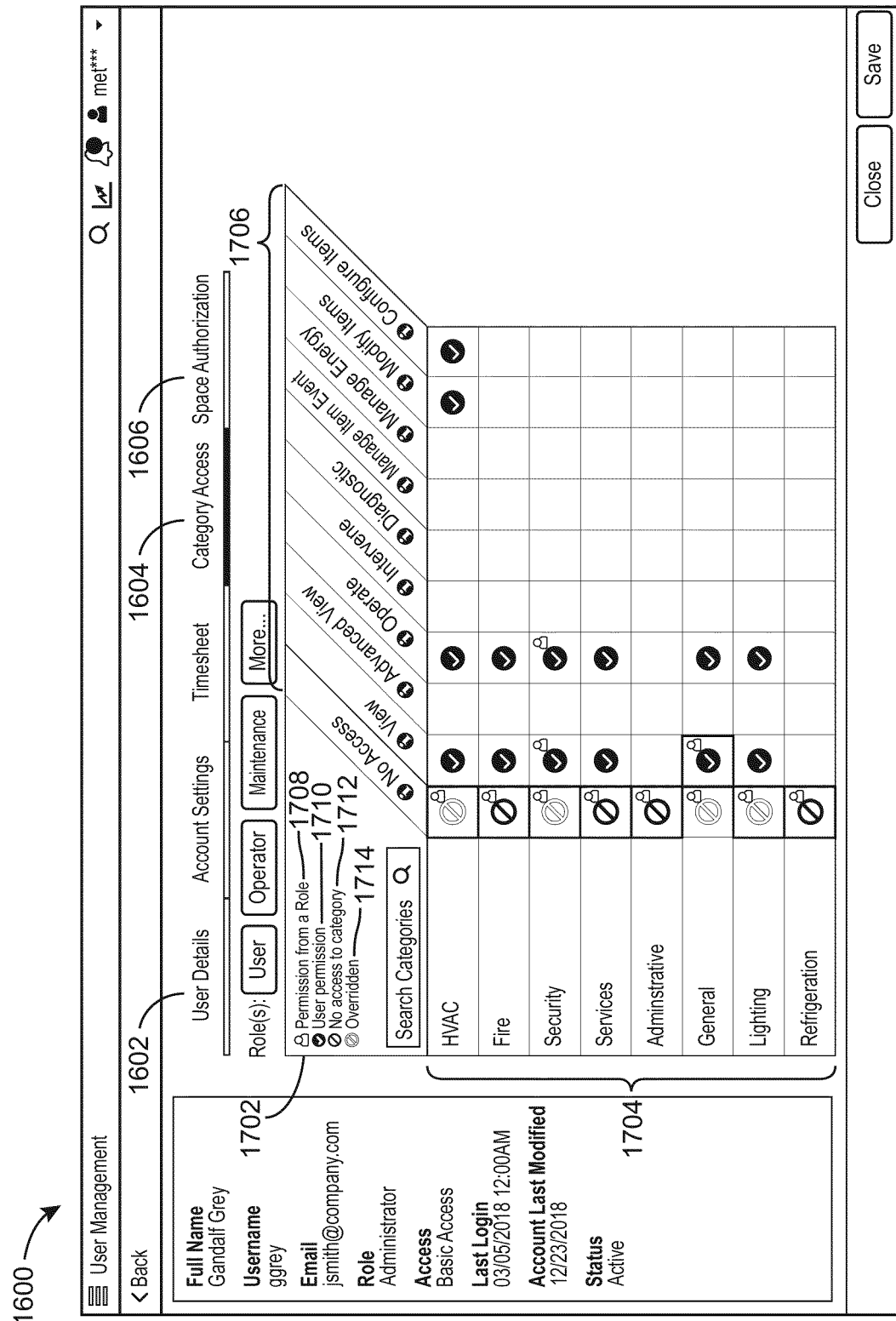
FIG. 17 is a tenth view of an administrator portal in a graphical user interface for a BMS, according to an exemplary embodiment.

A user can navigate to a category access tab 1604 of the edit user widget as shown in FIG. 17. The category access tab 1604 includes a permissions array 1702. The permissions array 1702 includes a label column 1704 that lists categories including equipment types, building domains, and/or other categories (e.g., HVAC, Fire, Security, Services, Administrative, General, Lighting, Refrigeration). The permissions array 1702 also includes a label row 1706 that lists various permissions that user might have related to the one of the categories (e.g., no access, view, advanced view, operate, intervene, diagnostic, manage item event, manage energy, manage energy, modify items, configure items). A check mark 1710 in the array may indicate that the user has the corresponding permission for the corresponding category. A no access symbol 1712 may be included to indicate that a user lacks access to a corresponding category. In the example shown, a role icon 1708 is included to indicate that a permission is granted because of a role of a user. An override icon 1714 may also be included to visualize permissions that deviate from default or from role-based permissions. A user may therefore be presented with a concise view of the various permissions for the user for various categories, the source of such permissions, and any changes that have been made to those permissions. The permissions array may also be configured to allow an administrator to alter the user's permissions relating to category access.

Figure 18:
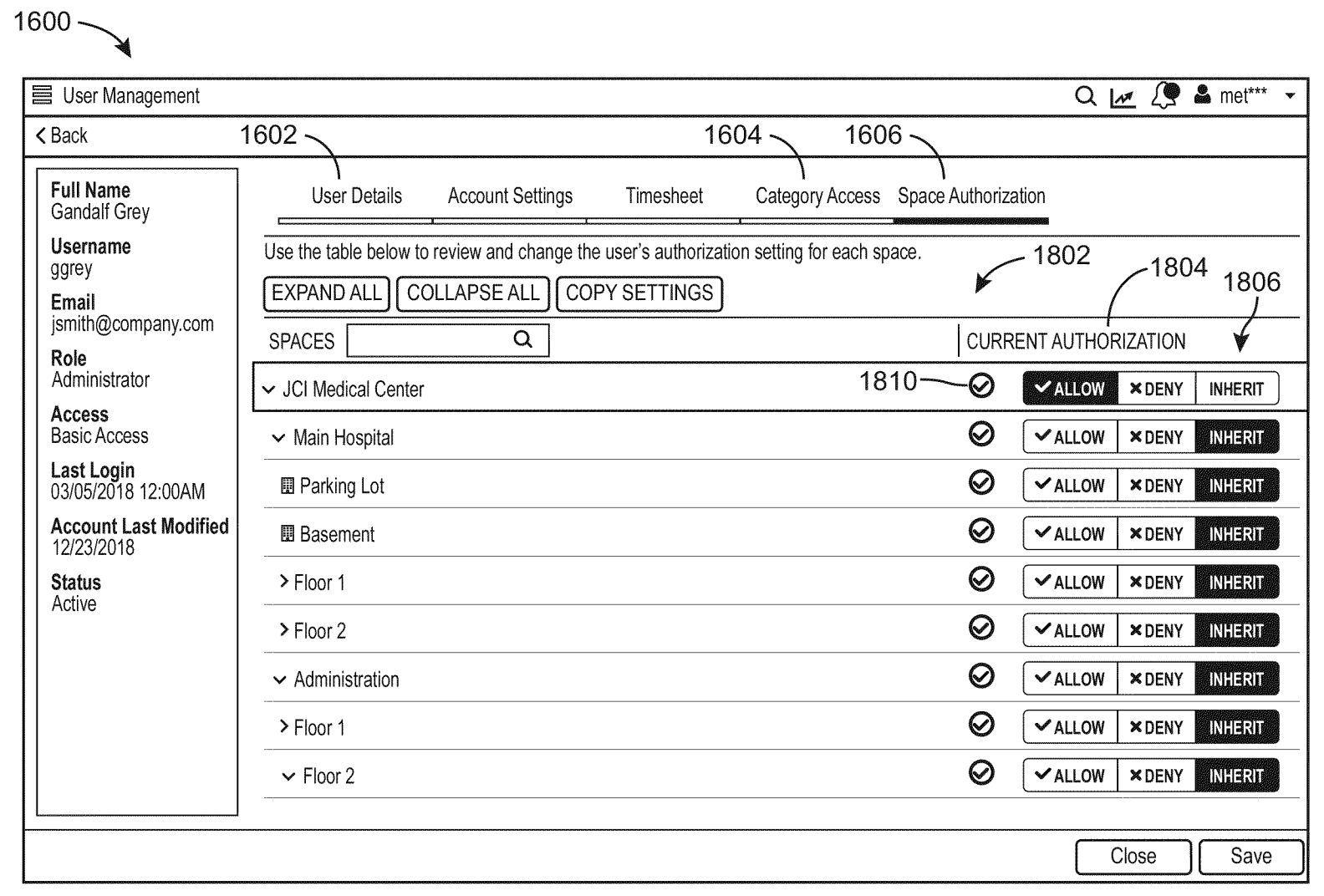

In some embodiments, a user can navigate to the space authorization tab 1606 of the user management widget 1600 as shown in FIG. 18. The space authorization tab 1606 allows an administrator to view and edit the spaces served by the BMS for which the user does or does not have authorization. The space authorization widget 1606 includes a collapsible, hierarchical list 1802 of spaces within larger places. The list 1802 includes a current authorization 1804 for both the spaces and the places composed of the spaces. The current authorization 1804 is indicated by buttons 1806 that can be selected to edit the current authorization. In the example shown, the user is allowed authorization for a medical center, as well as for spaces within the medical center which are set to inherit their authorizations from the authorization for the parent place (i.e., for the medical center). An administrator may also individually edit the authorization for any given space, for example to deny the user authorization for one building or floor of the medical center while allowing authorization for other spaces. A visual indicator 1810 (shown as a check mark icon) may be included to provide a concise visual indication of whether a user is authorized for a particular space.

The graphical user interface illustrated in FIGS. 13-18 thereby prompts an administrator to create a new user, edit biographical information for a user, edit password and access information for the user, edit category authorizations for the user, and edit space authorizations for the user, all within a single widget or graphical user interface. This concise and unified presentation of options facilitates user management in a building management system and improves the efficiency of creating and managing users.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building management system (BMS) comprising:
a storage device having instructions stored thereon that, when executed by one or more processors, cause the one or more processors to perform operations comprising:
receiving an indication of an event relating to building equipment operable to serve spaces of a building, the indication identifying at least one of a space or a type of equipment associated with the event;
providing, based on an escalation strategy for the event, a first list of recipients to send a message related to the event if the event has not been acknowledged after a first amount of time by one of a list of users.

2. The BMS of claim 1, wherein providing the first list of recipients the message if the event has not been acknowledged after the first amount of time.

3. The BMS of claim 2, wherein the message comprises link, button, or other means for a notification recipient to acknowledge receipt of a notification.

4. The BMS of claim 2, wherein the first list of recipients is exclusive of the list of users, the list of users receiving the indication of the event based upon a first filter specifying one or more criteria for satisfying the first filter, the one or more criteria comprising at least one of space criterion or equipment criterion.

5. The BMS of claim 4, wherein the operations further comprise:
providing a notification of the event to a subset of users associated with the first filter in response to a determination that the one or more criteria are satisfied for the first filter.

6. The BMS of claim 4, wherein the first amount of time is entered by a user.

7. The BMS of claim 6, wherein the escalation strategy is provided using an escalation widget comprising a priority entry, message entry, and a site name entry.

8. The BMS of claim 4, wherein the space criterion requires that the event is associated with a particular space of the building and the equipment criterion requires that the event is associated with a particular device o the building equipment.

9. The BMS of claim 4, the operations further comprising providing a graphical user interface, wherein providing the message comprises presenting the message via the graphical user interface.

10. The BMS of claim 1, wherein the operations further comprise:
providing, based on the escalation strategy for the message, a second list of recipients to send the message related to the event if the event has not been acknowledged after a second amount of time by at least one recipient on the second list of recipients.

11. A method of providing a notification of an event relating to building equipment, the method comprising:
receiving an indication of the event, the indication identifying at least one of a space or a type of equipment associated with the event;
determining, based on the indication, that one or more criteria are satisfied for a first list of recipients, the one or more criteria comprising at least one of space criterion or equipment criterion;
providing the notification to the first list of recipients in response to a determination that the one or more criteria are satisfied; and
providing to a second list of recipients the notification if the event has not been acknowledged after a first amount of time by one of in the first list of recipients.

12. The method of claim 11, wherein providing the notification comprises transmitting the notification to one or more user devices associated with the first list of recipients.

13. The method of claim 11, wherein the space criterion requires that the event is associated with a particular space of a building and the equipment criterion requires that the event is associated with a particular device of the building equipment.

14. The method of claim 11, further comprising:
receiving, from a user device associated with an administrator, a space authorization and an equipment authorization for each of a plurality of users; and
determining, based on the space authorization and the equipment authorization, the first list of recipients.

15. The method of claim 11, further comprising providing a graphical user interface, wherein providing the notification comprises presenting the notification via the graphical user interface.

16. The method of claim 11, further comprising:
providing a third list of recipients to send a second notification related to the event if the event has not been acknowledged after a second amount of time by at least one recipient on the second list of recipients.

17. The method of claim 16, wherein the notification is a first notification, the method further comprising:
transmitting the second notification responsive to a determination that the second notification has not been acknowledged after the second amount of time.

18. The method of claim 11, further comprising operating the building equipment based on a user input provided in response to the notification.

19. A system comprising:
an event detection circuit configured to detect an event relating to building equipment and characterize the event as associated with at least one of a space of a building or a type of equipment;
a notification system configured to provide a notification of the event to one or more users of the system by:
storing one or more criteria comprising at least one of a space criterion or an equipment criterion;

receiving an indication of the event from the event detection circuit, the indication identifying at least one of the space or the type of equipment associated with the event;

determining, based on the indication, that the one or more criteria are satisfied; and providing the notification of the event to a first set of users in response to a determination that the one or more criteria are satisfied.

20. The system of claim 19, wherein providing the notification comprises transmitting the notification to one or more user devices associated with the first set of users.

21. The system of claim 19, wherein the notification system is further configured to provide a second list of recipients the notification if the event has not been acknowledged after a first amount of time by one user in the first set of users.

* * * * *